United States Patent [19]

Abe et al.

[11] Patent Number: 4,651,164

[45] Date of Patent: Mar. 17, 1987

[54] THERMAL PRINT HEAD

[75] Inventors: Shuro Abe, Minoo; Yoshiro Yabuki, Toyono; Yasuhiko Takamatsu; Takayuki Yamaguchi, both of Minoo; Masatoshi Ohta, Ikeda; Eiji Nakamura, Toyonaka, all of Japan

[73] Assignee: Ricoh Company, Ltd., Tokyo, Japan

[21] Appl. No.: 881,527

[22] Filed: Jun. 30, 1986

Related U.S. Application Data

[63] Continuation of Ser. No. 587,257, Mar. 7, 1984, abandoned.

[30] Foreign Application Priority Data

Mar. 8, 1983 [JP] Japan ................................ 58-38849

[51] Int. Cl.$^4$ .............................................. G01D 15/70

[52] U.S. Cl. ................................ 346/76 PH; 400/170

[58] Field of Search ............ 346/76, 76 PH; 219/216, 219/216 PH; 400/120, 543; 338/308, 309

[56] References Cited

U.S. PATENT DOCUMENTS

| | | | |
|---|---|---|---|
| 3,631,459 | 12/1971 | Morris | 219/216 PH |
| 4,259,676 | 3/1981 | Salmon et al. | 346/76 PH |
| 4,405,929 | 9/1983 | Sugana | 346/76 PH |
| 4,506,272 | 3/1985 | Arai | 219/216 PH |

*Primary Examiner*—Arthur G. Evans

*Attorney, Agent, or Firm*—Cooper, Dunham, Griffin & Moran

[57] ABSTRACT

A thermal printhead for use in a thermal recording machine includes a substrate on which a plurality of heat-producing elements are formed in the form of a linear array and a plurality of I.C. driver chips provided along one side of the linear array, and the I.C. driver chip includes output pads formed in a line spaced apart from one another on its surface along one side thereof. Using such an I.C. driver chip, the linear array density of 8 elements/mm and thus recording density of 8 dots/mm is obtained.

9 Claims, 14 Drawing Figures

FIG. 11
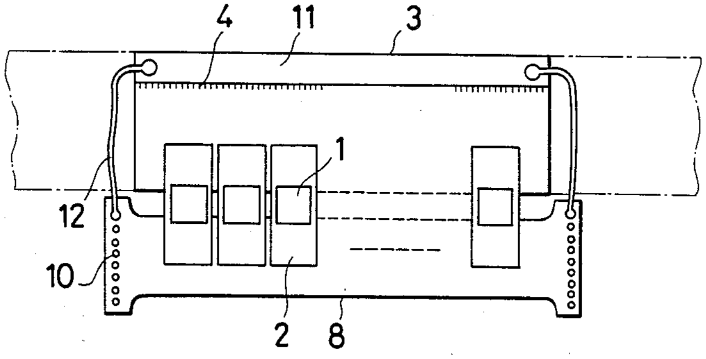
FIG. 12
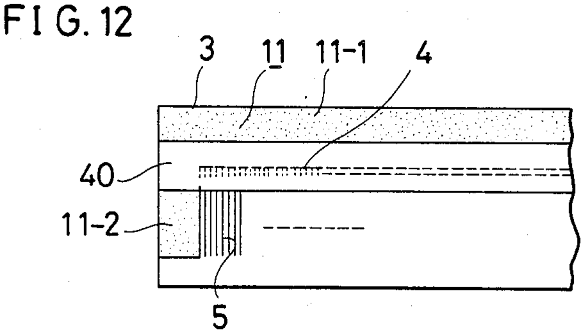
FIG. 13a
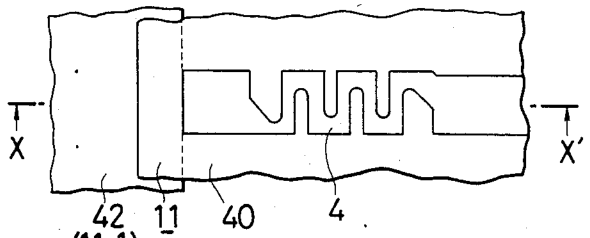
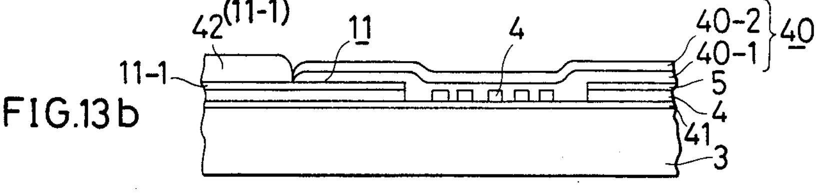
FIG. 13b

THERMAL PRINT HEAD

This is a continuation application from application Ser. No. 587,257 filed Mar. 7, 1984 now abandoned.

BACKGROUND OF THE INVENTION

1. Field of the Invention

This invention relates to a thermal printhead for use in a recording machine, such as a printer and a facsimile machine, for thermally recording characters in the form of a dot matrix on heat-sensitive paper in accordance with an electrical image signal supplied thereto, and particularly to a so-called edge type thermal printhead with a plurality of driving circuits arranged in a single array along one side of a linear thermal array comprised of a plurality of heat-producing elements.

2. Description of the Prior Art

Direct-drive type thermal printheads having directly mounted I.C. drivers, such as MSI and LSI intergrated circuit drivers, are well known in the art. Such thermal printheads may be generally divided into two categories. In one category, called the center type, I.C. drivers are provided on both sides of a linear thermal array of heat-producing elements; whereas, in the other category, called the edge type, I.C. drivers are provided only along one side of the linear thermal array. There are advantages and disadvantages in either of these categories.

The largest disadvantage of the edge type thermal printhead has been said to be difficulty in increasing the array density of heat-producing elements, each of which constitutes a picture element or pixel to form a so-called "burn point" on heat-sensitive paper when activated by passing a driving current therethrough. For example, in providing I.C. driver chips directly on a thermal printhead for controlling heat-producing elements 32 per chip by the tape carrier method, it has been difficult to arrange the I.C. chips at a pitch of 8 mm or less. Thus, even in the case where the array pitch of 8 dots/mm may be attained with all of the remaining specifications satisfied if use is made of the center type structure, the only array density of 4 dots/mm may be attained if I.C. driver chips are provided in the edge type structure. As a result, utilization of the edge type structure effectively inhibits the application of the thermal printhead to recording machines requiring high density recording, such as facsimile machines.

On the other hand, an edge type thermal printhead may be manufactured relatively easily as compared with that of the center type. Another important advantage of the edge type thermal printhead is that recorded images can be inspected immediately since they appear as soon as they are recorded. Thus, there has been a long felt need to increase the recording density and thus the heat-producing array density of an edge type thermal printhead.

SUMMARY OF THE INVENTION

It is therefore a primary object of the present invention to provide an improved thermal printhead.

Another object of the present invention is to provide an edge type thermal print head having an increased heat-producing array density thereby allowing to record an image of excellent quality.

A further object of the present invention is to provide a direct-drive type thermal printhead of the edge type in which a plurality of I.C. driver chips are provided along one side of a thermal array comprised of a plurality of heat-producing elements.

A still further object of the present invention is to provide an edge type thermal printhead simple in structure, low in cost, small in size and light in weight.

Other objects, advantages and novel features of the present invention will become apparent from the following detailed description of the invention when considered in conjunction with the accompanying drawings.

BRIEF DESCRIPTION OF THE DRAWINGS

FIG. 11 is a schematic illustration showing an embodiment in which connecting points of leads to a common electrode are disposed at a side opposite to the side where I.C. driver chips are provided with respect to a linear thermal array of heat-producing elements;

FIG. 12 is a schematic illustration showing an embodiment in which part of the common electrode is exposed out of the protective film; and FIG. 13*a* is a schematic illustration in plan view showing on an enlarged scale the structure of a heat-producing element forming part of a linear thermal array; and FIG. 13*b* is a cross-sectional view taken along X—X' line indicated in FIG. 13*a*.

DESCRIPTION OF THE PREFERRED EMBODIMENTS

Figure 1:
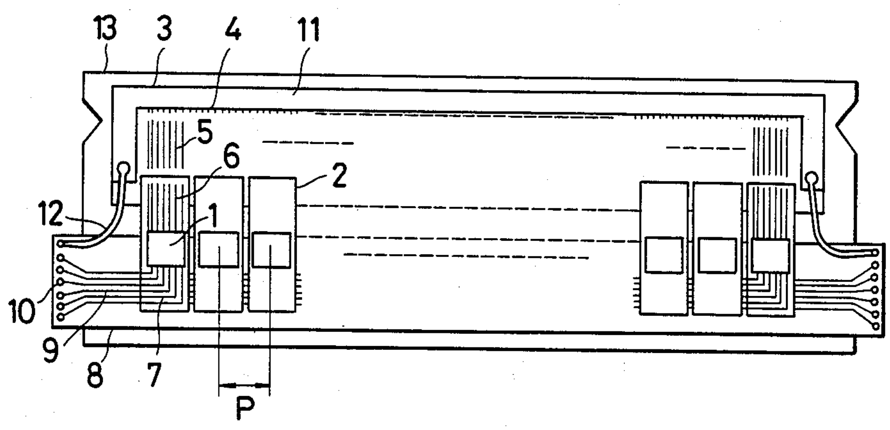
FIG. 1 is a schematic illustration in plan view showing part of an edge type thermal printhead having a plurality of I.C. driver chips provided along one side of a thermal array including a plurality of heat-producing elements constructed in accordance with one embodiment of the present invention.

Referring now to FIG. 1, there is shown an edge type thermal printhead constructed in accordance with one embodiment of the present invention in which a plurality of I.C. driver chips 1, each mounted on a tape carrier 2, are provided along one side of a linear thermal array comprised of a plurality of heat-producing elements 4, typically electrically resistive elements which produce heat when activated selectively by passing driving current therethrough. The thermal printhead of FIG. 1 includes a glazed ceramic substrate 3 having a glaze layer at its surface. The substrate 3 is generally rectangular in shape and provided with a plurality of heat-producing elements 4 as arranged in the form of a horizontally extending linear thermal array as spaced apart from one another at a predetermined pitch along one side thereof. Also provided on the substrate 3 are a plurality of individual electrodes 5 each extending vertically over a predetermined distance and connected to the corresponding one of the plurality of heat-producing elements 4 with the other ends of the individual electrodes 5 defining an imaginary connection line running horizontally in parallel with the linear thermal array of the heat-producing elements 4.

The tape carriers 2, each mounting thereon the I.C. driver chip 1 and provided with a first set of leads 6 which are connected to output pads disposed along one side of the rectangularly shaped I.C. driver chip 1 and a second set of leads 7 which are connected to control signal and ground pads disposed along the side of the chip 1 opposite to the side where the output pads are disposed. The leads 6 are also connected to the corresponding ones of the individual electrodes 5 at their top ends; on the other hand, the leads 7 are also connected to respective interconnection lines 9 printed on another substrate 8 of glass epoxy or the like. The left ends of the interconnection lines 9 defines a connector portion where input/output terminals 10 are provided. It is to be noted that the substrates 3 and 8 may be integrated, if desired. The heat-producing elements 4 are connected at their top ends to a common electrode 11 which includes a horizontally extending portion extending along one side of the substrate 3 and a pair of vertically extending portions each extending vertically from the corresponding end of the horizontally extending portion. A pair of leads 12, 12 are provided each connected between the common electrode 11 and a power supply terminal which is one of the input/output terminals 10. The thermal printhead of FIG. 1 also includes a supporting plate 13 on which the ceramic substrate 3 and the substrate 8 are fixedly supported.

In the thermal printhead shown in FIG. 1, the I.C. driver chip 1 mounted on the tape carrier 2 is so structured to control 32 heat-producing elements 4, and the arrangement pitch P between the two adjacent I.C. driver chips 1 and 1 is 4 mm. Thus, the array density of heat-producing elements 4 is 8 dots/mm.

Figure 2:
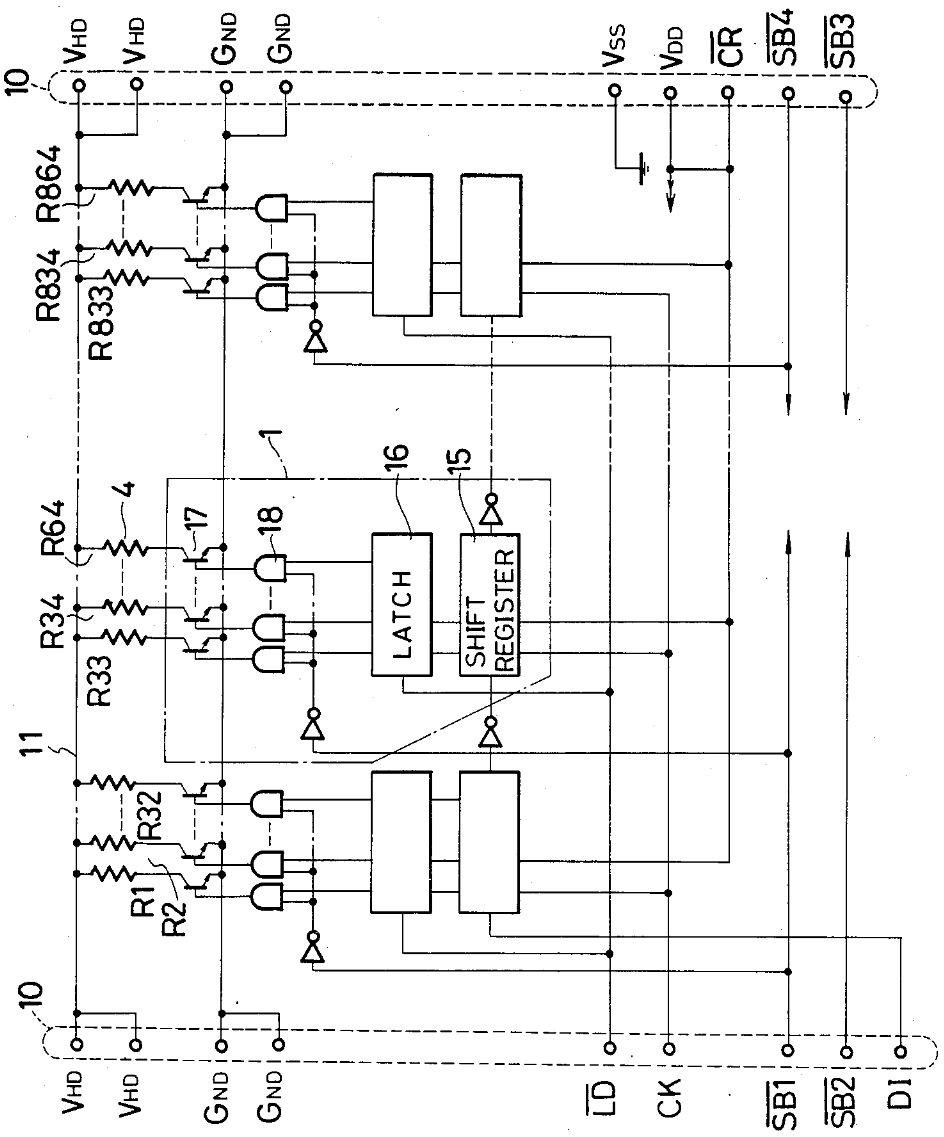
FIG. 2 is a circuit diagram showing the electrical structure of the thermal printhead shown in FIG. 1.

Referring now to FIG. 2 showing an electrical structure of the thermal printhead of FIG. 1, the linear thermal array of heat-producing elements 4 includes 864 electrical resistors R1 through R864 which are divided into 27 blocks each of which is controlled by an individual I.C. driver chip 1. Thus, 27 such I.C. driver chips 1 are provided.

Each I.C. driver chip 1 includes a 32-bit shift register 15 through which image data supplied via a data input terminal DI is transferred with the timing of a clock signal CK, a latch circuit 16 which receives the 32 bit data in parallel from the shift register 15 with the timing of a load signal LD, 32 bipolar transistors 17 each of which has its collector ultimately connected to the corresponding resistor 4, its base connected to receive image data and its emitter connected to ground, 32 AND gates 18 which allow the data stored in the latch 16 to be supplied to the corresponding transistors 17 during a time period in which a strobe signal $\overline{SB}$ is low. The circuit of this I.C. driver chip 1 may have a so-called Bi-CMOS structure having its output driver portion formed by bipolar transistors and the remaining portion including logic circuits, such as a shift register, by CMOSs, or an $I^2L$ structure. In the present embodiment, the heat-producing elements 4, or resistors R1 through R864 are also divided into four groups which are activated by four strobe signals $\overline{SB1}$ through $\overline{SB4}$ independently of one another.

Also provided are power supply terminals $V_{HD}$ through which driving power is supplied to the elements 4 and ground terminals GND to which driving current flowing through the elements 4 flow. Also provided are a power supply terminal $V_{DD}$ for supplying power to the I.C. driver chip 1 itself and a ground terminal $V_{SS}$ for providing ground potential to the I.C. chip 1. Although the two ground terminals GND and $V_{SS}$ are provided separately in the structure shown in FIG. 2, they may be integrated, if desired. A clear terminal $\overline{CR}$ is also provided for supplying a clear signal to the shift register 15 to clear the data stored therein. It is to be noted that such a clearing operation may be carried out internally within the I.C. instead of providing as a control pad as shown in this embodiment.

Described the operation of the structure shown in FIG. 2 briefly, after shifting the data supplied via the data input terminal DI from the 1st or leftmost shift register 15 to the 27th or rightmost shift register 15, the data in the shift registers are transferred to the corresponding latch circuits 16 by the load signal LD. Then, with the application of strobe signals via the strobe signal terminals $\overline{SB1}$ through $\overline{SB4}$ selectively, those AND gates 18 which receive high level data from the latches 16 allow to pass the high level data to the corresponding driver transistors 17 to have them turned on. As a result, the driving current flows from the power supply terminal $V_{HD}$ to the ground terminal GND through the common electrode 11, those transistors 17 which are rendered conductive and the resistors 4, so that the driving current flows through the resistors 4 during a time period in which the strobe signal $\overline{SB1}$ through $\overline{SB4}$ is low thereby producing heat which is then applied to heat-sensitive paper to form "burn points" thereon. As is well known in the art, this operation is repetitively carried out with the heat-sensitive paper moved relative to the thermal printhead of FIG. 1 in contact with the linear thermal array of resistors 4.

Figure 3:
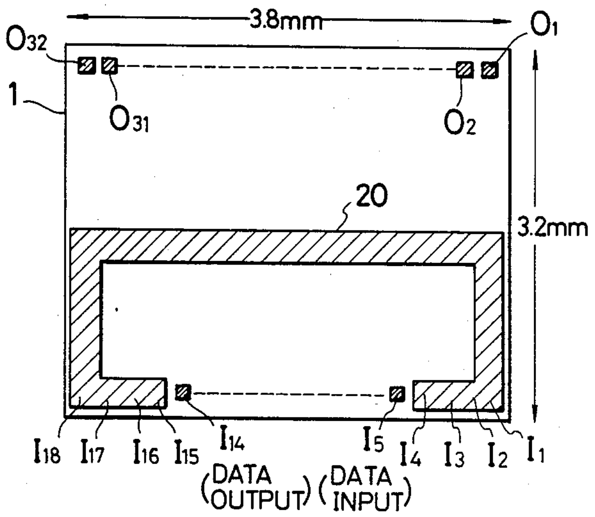
FIG. 3 is a plan view schematically showing the pad arrangement on a surface of an I.C. driver chip used in the thermal printhead of FIG. 1.

FIG. 3 schematically illustrates the arrangement of pads on a surface of the I.C. driver chip 1 employed in the thermal printhead of FIG. 1. As shown, the I.C. driver chip 1 includes output pads $O_1$ through $O_{32}$ as arranged in a line along one side of the surface of the I.C. chip 1 as spaced apart from one another in the order from the right to the left, and these output pads $O_1$ through $O_{32}$ are ultimately connected to the driver transistors 17. Ground pads $I_1$ through $I_4$ and $I_{15}$ through $I_{18}$ are also provided on the surface of the pad 1 along and on both end portions of the side opposite to the side where the output pads $O_1$ through $O_{32}$ are provided. These ground pads are to be connected to supply ground potential to the driver transistors 17. Also provided on the surface of the I.C. chip 1 are control signal pads $I_5$ through $I_{14}$ as arranged along the side where the ground pads $I_1$ through $I_4$ and $I_{15}$ through $I_{18}$ are provided and between these ground pads. Among those control signal pads $I_5$ through $I_{14}$, the rightmost pad $I_5$ is a data input pad and the leftmost pad $I_{14}$ is a data output pad with the remaining pads used for clock signals and load signals.

The ground pads $I_1$ through $I_4$ and $I_{15}$ through $I_{18}$ are connected to a C-shaped lead 20 which is formed on the surface of the I.C. driver chip 1 by gold or solder so as to be able to carry a relatively large current. The horizontally extending portion of this C-shaped lead 20, which extends horizontally from one side to the opposite side of the I.C. driver chip 1, is connected to a ground contact of Al or the like connected to the emitters of the driver transistors 17. Such a ground contact within the I.C. driver chip 1 may be provided one for each of the driver transistors 17; however, it is preferable to form a group for an appropriate number of driver transistors 17 for each such ground contact and to make these ground contacts connected to the lead 20 on the I.C. chip 1 because in this manner the number of bonding points between such ground contacts and the lead 20 may be reduced thereby allowing to increase reliability. With the provision of the C-shaped lead 20 on the surface of the I.C. chip 1, the ground terminal within the I.C. chip 1 may be simplified structurally thereby allowing to arrange the output pads $O_1$ through $O_{32}$ densely. The length of the side of the I.C. chip 1 along which the output pads $O_1$ through $O_{32}$ are arranged linearly is 3.8 mm.

Figure 4:
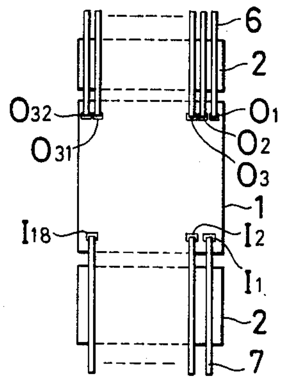
FIG. 4 is a plan view showing the state in which the I.C. driver chip of FIG. 3 is mounted by the tape carrier method.

In the case of mounting the I.C. driver chip 1 of the present embodiment having the output pads $O_1$ through $O_{32}$ arranged along its one side on the thermal printhead by the tape carrier method, use may be made of a tape carrier 2 having a narrow width which is approximately equal to the width of the I.C. chip 1, as shown in FIG. 4. If the I.C. chip 1 is mounted in this manner, the I.C. chips 1 may be arranged linearly at a pitch of 4 mm or less, so that there may be obtained an edge type thermal printhead having the heat-producing element array density of 8 dots/mm.

Figure 5:
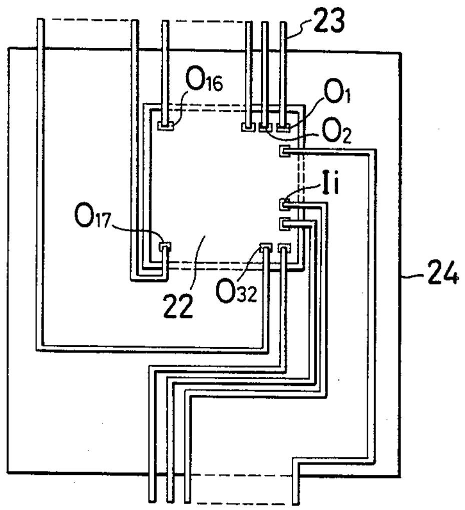
FIG. 5 PRIOR ART
FIG. 5 is a plan view showing the mounting state of an I.C. driver chip in a prior art thermal printhead.

On the other hand, in the case of a prior art 32-bit I.C. driver chip, output pads $O_1$ through $O_{32}$ are arranged along tow different sides, as shown in FIG. 5. For this reason, in order to have this chip mounted by the tape carrier method, some of tape carrier leads 23 must be provided on a tape carrier by going around the I.C. chip 22, which necessitates to make the width of the tape carrier 24 larger. Accordingly, in the prior art edge type thermal head, the heat-producing element array density was limited to 4 dots/mm.

Figure 6:
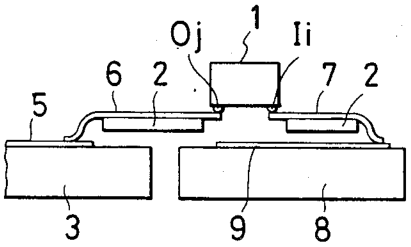
FIG. 6 is a side elevational view showing the condition in which an I.C. driver chip is mounted by the face down method.
Figure 7:
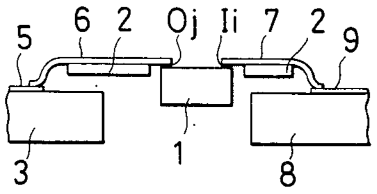
FIG. 7 is a side elevational view showing the condition in which an I.C. driver chip is mounted by the face up method.

In mounting the I.C. chip 1 using the tape carrier 2, there are two methods: a face down method as shown in FIG. 6 and a face up method as shown in FIG. 7. As is apparent from these figures, the face down method of FIG. 6 is superior to the face up method of FIG. 7 in terms of area requirements because the I.C. chip 1 may be disposed above the substrate 8 in the face down method thereby allowing to make the thermal printhead smaller in size.

Figure 8:
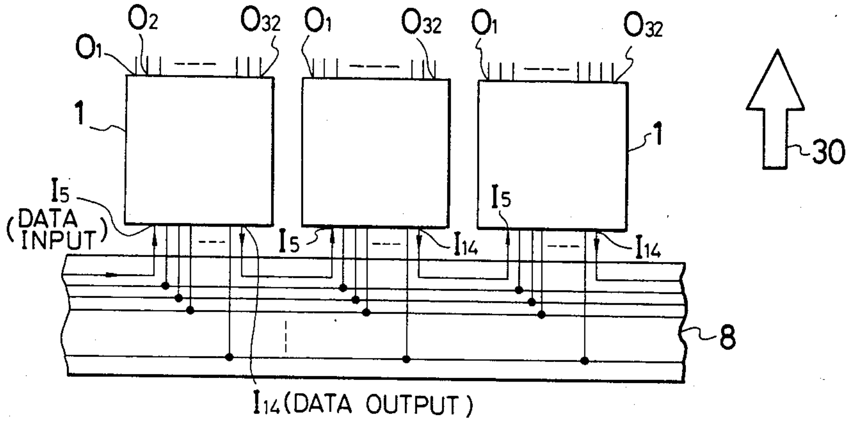
FIG. 8 is a schematic illustration in plan view showing the condition in which the I.C. driver chips of FIG. 3 are provided side-by-side by the face down method.

FIG. 8 schematically shows the condition in which the I.C. chips 1 of FIG. 3 are mounted in the face down method, which is viewed from a rear surface of the I.C. chip 1 which is opposite to the front surface on which the before-mentioned pads are provided. It is to be noted that since the front surface of the I.C. chip 1 is shown in FIG. 3 and the rear surface of the I.C. chip 1 is shown in FIG. 8, the right to the left relation is reversed. In the structure shown in FIG. 8, recording paper, typically heat-sensitive paper, moves in the direction indicated by an arrow 30 with respect to the thermal printhead.

In the I.C. chip 1 shown in FIG. 3, the output pads $O_1$ through $O_{32}$ are arranged from the right to the left on its front surface (or from the left to the right in the rear surface in FIG. 8) and the data input pad $I_5$ and the data output pad $I_{14}$ among the control signal pads are arranged on both ends of the linear arrangement thereof, in which the pad $I_5$ is located at the right end (or left end in FIG. 8) and the pad $I_{14}$ is located at the left end (right end in FIG. 8). Since the shift registers 15 each provided in each of the I.C. chips 1 must be connected serially, the arrangement of the data input and output pads as described above allows to be connected to the leads on the substrate 8 without crossing the other control signal lines.

With such a structure, the data input pad is located at the left end and thus the first bit of image data when shifted through the shift register 15 of the I.C. chip 1 appears at the right end, which process is repeated until the first bit of image data is transferred to the right end of the shift register 15 of the rightmost I.C. chip 1 whereby the first bit of image data constitutes leftmost image information to be recorded on the recording paper moving in the direction of the arrow 30. Accordingly, there is no need to invert or rearrange the image data, which allows to simplify an interface to be used. Furthermore, the recording paper moves in the direction from the I.C. chip 1 to the linear thermal array of heat-producing elements 4, recorded information on the recording paper may be observed as soon as it is recorded on the paper, which also allows to make a top margin narrower. Moreover, since the ground pads for the output drivers are arranged on both end portions along one side of the I.C. chip 1, there is no need to provide leads on the substrate 8. It is to be noted that the arrangement of the output pads, control signal pads and ground pads should not be limited to that shown in FIG. 3. However, other possible arrangements would suffer some problems as will be described below.

Figure 9:
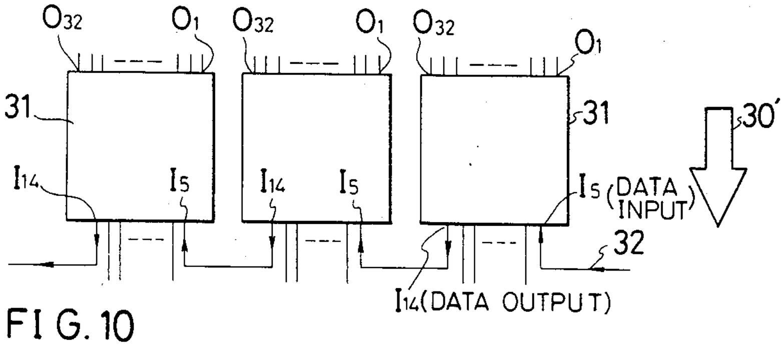
FIGS. 9 and 10 are schematic illustrations in plan view showing the mounting conditions in which I.C. driver chips having different pad arrangements are provided by the face down method.

FIG. 9 shows the condition in which I.C. chips 31 each having the output pads $O_1$ through $O_{32}$ and the control signal pads $I_5$ through $I_{14}$ which are reversed in the order from the right to the left from the order in the structure of FIG. 3 are mounted in the face down method using tape carriers. Similarly with FIG. 8, FIG. 9 is a schematic illustration when viewed from the rear surfaces of the I.C. chips 31. In the structure shown in FIG. 9, image data flows through the shift registers in the direction indicated by the arrow 32, and, thus, if it is desired to have the first bit of such image data to be located at the left side of recording paper, the recording paper must be moved in the direction indicated by the arrow 30' which is opposite to the paper moving direction 30 in FIG. 8. For this reason, information recorded on the recording paper by the linear thermal array of heat-producing elements 4 must move past the I.C. chips 31 before appearing beyond the perimeter of the thermal printhead, it takes some time for the operator to observe the recorded information and a wider top margin will be necessarily created.

Figure 10:
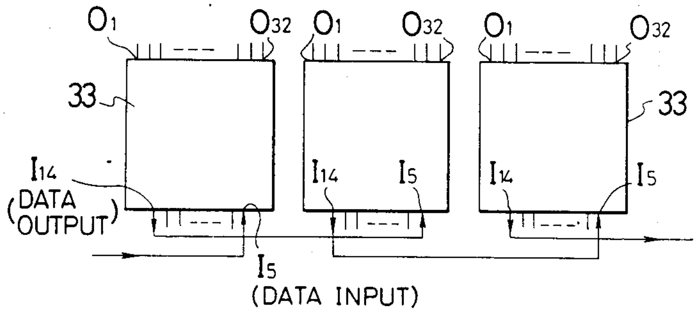

FIG. 10 illustrates the condition in which I.C. chips 34 each including the output pads $O_1$ through $O_{32}$, which are the same as in the structure of FIG. 3, and the data input and output pads $I_5$ and $I_{14}$, which are reversed in position with respect to the right and left relation as compared with the structure of FIG. 3, are mounted along one side of the linear thermal array of heat-producing elements 4. In this case, as shown in FIG. 10, data input and output lines cross each other and other control signal lines. Such a pad arrangement shown in FIG. 10 is also possible, but it is not preferred.

The driver I.C. may be either in a Bi-CMOS structure or in an $I^2L$ structure. When constructed in a Bi-CMOS structure, a breakdown voltage may be set at a higher level as compared with an $I^2L$ structure. Thus, the electrical resistance of a heat-producing element 4 may be made larger, which allows to use a higher voltage and a smaller current in producing the same level of temperature as compared with the case of using the $I^2L$ structure. This indicates that the Bi-CMOS structure will create less noises and allows to use a power supply smaller in capacity.

For instance, for a thermal printhead including 2,048 heat-producing elements each of which is capable of producing heat of 0.5 W, if use is made of a driver circuit having the Bi-CMOS structure of the present embodiment, assuming that each of the heat-producing elements has the resistance of 700 ohms, the applied voltage will be calculated by $$V=(R\times W)^{\frac{1}{2}} \quad (1)$$

to be 18.7 V. The Bi-CMOS structure may withstand the voltage up to approximately 30 V. In this case, the total current value I may be calculated by $$I=(W/R)^{\frac{1}{2}}\times 2{,}048 \quad (2)$$

to be 54 A. In reality, since the heat-producing elements 4 are driven as divided by a group of 4 or 8 by a strobe signal, the current of 54 A will not flow at a time.

On the other hand, in the case where use is made of an $I^2L$ structured I.C., the breakdown voltage up to approximately 10 V is possible so that the resistance of a heat-producing element must be set by $$R=V^2/W \quad (3)$$

to be 200 ohms or less. Under the condition, the current value may be calculated by the above equation (2) to be 102.4 A, which is nearly twice as large as the current of the Bi-CMOS structured embodiment.

A large current flows between the collector and the emitter of the driver transistor 17 as described above and this large current flows into the ground terminal GND. Thus, in order to prevent noises from being produced in the logic circuit section through the ground terminal $V_{SS}$, it is preferable to provide the ground terminal GND of the driver section and the ground terminal $V_{SS}$ of the logic circuit section separately and to integrate them in the vicinity of the power supply, or to provide a capacitor having a large capacity as inserted between the driving power source $V_{HD}$ and the ground terminal GND and between the voltage source $V_{DD}$ of the logic circuit section and the ground terminal $V_{SS}$.

In the embodiment shown in FIG. 1, the common electrode 11 has a horizontally extending section and a pair of vertically extending sections which extend vertically downward from both ends of the horizontally extending section and terminate approximately at the top end of the tape carrier 2. And, the leads 12 extend from the bottom ends of the vertically extending sections to the respective terminals 10. With this structure, the leads 12 may also be enclosed when a top cover (not shown) is mounted on the thermal printhead, which is advantageous.

FIG. 11 illustrates another embodiment in which the common electrode 11 is comprised only of the horizontally extending portion. In this case, the leads 12 must extend from the horizontally extending portion which is located at the side opposite to the side where the I.C. driver chips 1 are provided. In this structure, it is not necessary to provide vertically extending portions as different from the embodiment of FIG. 1. Thus, it may be manufactured such that the common electrode 11, individual electrodes 5 and heat-producing elements 4 are formed on a long ceramic substrate as indicated by the one-dotted line and the long substrate is cut to a desired size. Such a manufacturing method is advantageous because even if local defects are formed in such a lengthy substrate, it may be cut appropriately to provide short substrates of desired size without defects, thereby allowing to enhance yield. Moreover, as compared with the case of forming the required elements such as electrodes and heat-producing elements on a short substrate right from the beginning, forming the required elements on a lengthy substrate which is then cut to a desired size allows to reduce processing steps and cost.

On the heat-producing elements 4 is provided a protective layer for protecting the elements 4 from friction with the recording paper and for preventing their resistances from fluctuating due to oxidation. Such a protective layer may be so provided to cover the common electrode 11 completely, or to have portions 11-1 and 11-2 of the common electrode 11 exposed, as indicated in FIG. 12. In the case of providing the leads 12 which extend from the horizontally extending common electrode 11 at the side opposite to the side where the I.C. chips 1 are provided with respect to the linear thermal array of heat-producing elements 4, as shown in FIG. 11, in particular, in the case of providing the leads 12 to the common electrode 11 formed on the substrate cut from a lengthy substrate, the leads 12 may be connected to the exposed portion 11-1. Preferably, the exposed common electrode portions 11-1 and 11-2 are plated with gold or nickel to form thicker electrically conductive films thereby increasing the current carrying capability.

A method of making the portions 11-1 and 11-2 of the common electrode 11 exposed and providing thicker films in the exposed portions will be briefly described with reference to FIGS. 13*a* and 13*b*. First, on the surface of the ceramic substrate 3 having a glaze layer 41 at the surface is formed a film of $Ta_2N$ by sputtering to the thickness of several 1,000 angstroms, which will be later patterned into heat-producing elements. Then, an electrically conductive layer is formed thereon from NiCr by evaporation to the thickness of several 100 angstroms. Then a layer of Au is formed by evaporation to the thickness of several 1,000 angstroms and then an additional layer of Au is formed by plating (primary plating) to the thickness of several 1,000 angstroms. Then, using a well known photolithography technique, the electrically conductive layer is patterned to form the individual electrodes 5 and the common electrode 11 and then the heat-producing elements 4 are formed by patterning the film of $Ta_2N$.

Then, an oxidation-resistant film 40-1 of $SiO_2$ as a protective layer is formed by mask sputtering to the thickness of a few microns, and then a friction-resistant film 40-2 of $Ta_2O_5$ also as a protective layer is formed by mask sputtering to the thickness of a few microns. At this time, the portions 11-1 and 11-2 of the common electrode 11 to be exposed remain covered by a mask to prevent a film from being formed during sputtering. Then, another gold plating treatment (secondary plating) is carried out to plate the exposed portions 11-1 and 11-2 of the common electrode 11 to form a gold plated film to the thickness of a few microns. Finally, the substrate thus processed is fixedly mounted on the supporting plate 13 together with the other substrate 8 on which interconnection lines are printed and then the tape carriers 2 each mounting thereon the I.C. driver chip 1 are fixedly attached to complete the manufacturing process.

In the above-described process, since the Au film is increased in thickness during the secondary plating step after the photolithography step for patterning the electrodes, etc., the photolithography step may be easily carried out and the amount of gold used may be minimized because the plating is carried out to the common electrode after patterning.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An I.C. driver chip for use in a thermal printhead as mounted thereon for driving at least one of a plurality of heat-producing elements formed in the form of a linear array on said printhead, wherein said chip has a surface of predetermined shape and is provided with a first plurality of output pads, a second plurality of ground pads and a third plurality of control signal pads arranged on said surface, said first plurality of output pads being arranged in a first line along a first side of said surface and said second plurality of ground pads and said third plurality of control signal pads being arranged in a second line along a second side of said surface which is opposite to said first side, whereby some of said second plurality of ground pads are arranged at one end of said second line and the remaining of said second plurality of ground pads are arranged at the other end of said second line with said third plurality of control signal pads being arranged between said divided ground pads.

2. A chip according to claim 1 wherein said ground pads are all connected to a generally C-shaped lead formed on said surface.

3. A chip according to claim 2 wherein the rightmost pad of said third plurality of control signal pads is a data input pad and the leftmost pad of said third plurality of control signal pads is a data output pad with the remaining pads of said third plurality of control signal pads being used for clock and load signals.

4. A chip according to claim 1 wherein said first plurality of output pads arranged in said first line has an order from one end to the other.

5. A chip according to claim 1 wherein said chip has a BICMOS structure.

6. A chip according to claim 1 wherein said chip has an $I^2L$ structure.

7. An I.C. driver chip for use in a thermal printhead as mounted thereon for driving at least one of a plurality of heat-producing elements formed in the form of a linear array on said printhead, wherein said chip has a surface of predetermined shape and is provided with a first plurality of output pads, a second plurality of ground pads and a third plurality of control signal pads as arranged on said surface, and wherein said surface is also provided with a connection lead as formed thereon electrically connecting said second plurality of ground pads and also to a ground contact comprised of Al or the like and provided in said chip and connected to one electrode of each of a fourth plurality of driver transistors provided in said chip.

8. A chip according to claim 7 wherein said connection lead is comprised of gold or solder.

9. A chip according to claim 8 wherein said connection lead is generally C-shaped.

* * * * *